United States Patent
Boday et al.

(10) Patent No.: US 9,458,268 B2
(45) Date of Patent: Oct. 4, 2016

(54) LACTIDE-FUNCTIONALIZED POLYMER

(71) Applicant: International Business Machines Corporation, Armonk, NY (US)

(72) Inventors: Dylan J. Boday, Tucson, AZ (US); Timothy C. Mauldin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 14/243,034

(22) Filed: Apr. 2, 2014

(65) Prior Publication Data

US 2015/0284485 A1 Oct. 8, 2015

(51) Int. Cl.
*C08F 120/18* (2006.01)
*C08F 112/08* (2006.01)
*C08F 120/10* (2006.01)

(52) U.S. Cl.
CPC ............ *C08F 120/10* (2013.01); *C08F 112/08* (2013.01); *C08F 120/18* (2013.01); *C08F 2438/01* (2013.01)

(58) Field of Classification Search
None
See application file for complete search history.

(56) References Cited

U.S. PATENT DOCUMENTS

| | | | |
|---|---|---|---|
| 5,357,034 A | 10/1994 | Fridman et al. | |
| 5,922,832 A | 7/1999 | Randall et al. | |
| 5,952,433 A | 9/1999 | Wang et al. | |
| 6,306,209 B1 | 10/2001 | Woodworth et al. | |
| 6,359,081 B1 | 3/2002 | Simada et al. | |
| 6,495,631 B1 | 12/2002 | Randall et al. | |
| 6,730,772 B2 | 5/2004 | Shastri | |
| 7,049,373 B2 | 5/2006 | Matyjaszewski et al. | |
| 7,053,151 B2 | 5/2006 | Wang et al. | |
| 7,381,772 B2 | 6/2008 | Flexman et al. | |
| 7,491,438 B2 | 2/2009 | Demott et al. | |
| 7,531,585 B2 | 5/2009 | Ozawa et al. | |
| 7,807,745 B2 | 10/2010 | Agarwal et al. | |
| 7,863,382 B2 | 1/2011 | Ishii et al. | |
| 7,897,168 B2 | 3/2011 | Chen et al. | |
| 8,076,406 B2 | 12/2011 | Brule et al. | |

(Continued)

FOREIGN PATENT DOCUMENTS

CN 102229744 A 11/2011
CN 102229744 B 6/2013

(Continued)

OTHER PUBLICATIONS

Yang et al., "Hybrid copolymerization of cyclic and vinyl monomers," Sci. China, Ser. B., 2013, vol. 56, No. 8, 1101-1104.*

(Continued)

*Primary Examiner* — Ling Choi
*Assistant Examiner* — Catherine S Branch
(74) *Attorney, Agent, or Firm* — Matthew J. Bussan

(57) ABSTRACT

A lactide-functionalized polymer is represented by the following formula:

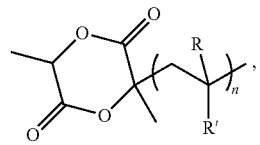

wherein R is a hydrogen atom or a methyl group, and wherein R' is a phenyl group or C(O)OR", wherein R" is an alkyl group having one or more carbon atoms.

4 Claims, 2 Drawing Sheets

(56) References Cited

U.S. PATENT DOCUMENTS

| | | |
|---|---|---|
| 8,232,343 B2 | 7/2012 | Chung et al. |
| 8,378,041 B2 | 2/2013 | Johnson et al. |
| 8,445,593 B2 | 5/2013 | Ishii et al. |
| 8,450,420 B2 | 5/2013 | Sakurai |
| 8,470,371 B2 | 6/2013 | Uchegbu et al. |
| 8,470,420 B2 | 6/2013 | Hiruma et al. |
| 8,490,259 B2 | 7/2013 | Hartgrove et al. |
| 8,519,018 B2 | 8/2013 | Patel |
| 2001/0027237 A1 | 10/2001 | Mayes et al. |
| 2003/0232088 A1 | 12/2003 | Huang et al. |
| 2004/0208844 A1 | 10/2004 | Ignatious |
| 2007/0196644 A1 | 8/2007 | Wu et al. |
| 2008/0247987 A1 | 10/2008 | Liggins et al. |
| 2009/0123412 A1 | 5/2009 | Healy et al. |
| 2009/0186992 A1 | 7/2009 | Higuchi et al. |
| 2009/0208695 A1 | 8/2009 | Funatsu et al. |
| 2009/0306333 A1 | 12/2009 | Jing et al. |
| 2010/0112357 A1 | 5/2010 | Fine et al. |
| 2011/0200784 A1 | 8/2011 | Agarwal et al. |
| 2011/0245420 A1 | 10/2011 | Rasal et al. |
| 2011/0313110 A1 | 12/2011 | Inagaki |
| 2013/0030128 A1 | 1/2013 | He et al. |
| 2013/0131275 A1 | 5/2013 | Tillman et al. |
| 2013/0184429 A1 | 7/2013 | Pugh et al. |

FOREIGN PATENT DOCUMENTS

| | | |
|---|---|---|
| EP | 2634179 A1 | 9/2013 |
| JP | 09316310 A | 12/1997 |
| JP | 2004051835 A | 2/2004 |
| JP | 2004285258 A | 10/2004 |
| JP | 2006212897 A | 8/2006 |
| JP | 2009079196 A | 4/2009 |
| JP | 2011032301 A | 2/2011 |
| WO | WO2009099225 A1 | 8/2009 |

OTHER PUBLICATIONS

Rzayev, Javid, "Synthesis of Polystyrene-Polylactide Bottlebrush Block Copolymers and Their Melt Self-Assembly into Large Domain Nanostructures", Macromolecules, vol. 42, No. 6, 2009, pp. 2135-2141.

Shinoda et al., "Structural Control of Poly(Methyl Methacrylate)-g-poly(Lactic Acid) Graft Copolymers by Atom Transfer Radical Polymerization (ATRP)", Macromolecules, vol. 34, No. 18, 2001, pp. 6243-6248.

Xia et al., "Efficient Synthesis of Narrowly Dispersed Brush Copolymers and Study of Their Assemblies: JThe Importance of Side Chain Arrangement", Journal of the American Chemical Society, vol. 131, No. 51, 2009, pp. 18525-18532.

Zhao et al., "Polystyrene-Polylactide Bottlebrush Block Copolymer at the Air/Water Interface", Macromolecules, vol. 42, No. 22, 2009, pp. 9027-9033.

Coulembier et al., Supporting Information for "From Jellyfish Macromolecular Architectures to Nanodoughnut Self-Assembly", vol. 43, No. 1, 2010, pp. 575-579, (5 pages of Supporting Information).

English Language Translation of JP10-001580 (1998), 20 pages.

List of IBM Patents or Patent Applications Treated as Related (Updated Oct. 19, 2015).

U.S. Appl. No. 14/833,080, to Boday et al., entitled "Initiation of Controlled Radical Polymerization from Lactide Monomer", filed Aug. 22, 2015, assigned to International Business Machines Corporation.

List of IBM Patents or Patent Applications Treated as Related.

U.S. Appl. No. 14/243,191, to Boday et al., entitled "Versatile, Facile and Scalable Route to Polylactic Acid-Backbone Graft and Bottlebrush Copolymers", filed Apr. 2, 2014, assigned to International Business Machines Corporation.

U.S. Appl. No. 14/525,130, to Boday et al., entitled "Versatile, Facile and Scalable Route to Polylactic Acid-Backbone Graft and Bottlebrush Copolymers", filed Oct. 27, 2014, assigned to International Business Machines Corporation.

U.S. Appl. No. 14/519,548, to Boday et al., entitled "Polylactic Acid (PLA) With Low Moisture Vapor Transmission Rates by Grafting Through of Hydrophobic Polymers Directly to PLA Backbone", filed Oct. 21, 2014, assigned to International Business Machines Corporation.

U.S. Appl. No. 14/519,549, to Boday et al., entitled "Flame-Retardant Polylactic Acid (PLA) by Grafting Through of Phosphorus-Containing Polymers Directly to PLA Backbone", filed Oct. 21, 2014, assigned to International Business Machines Corporation.

U.S. Appl. No. 14/526,943 , to Boday et al., entitled "Toughened Polylactic Acid (PLA) by Grafting Through of Impact-Modifying Polymers Directly to PLA Backbone ", filed Oct. 29, 2014, assigned to International Business Machines Corporation.

Yuan et al., "Inherent flame retardation of bio-based poly(lactic acid) by incorporating phosphorus linked pendent group into the backbone", Polymer Degradation and Stability, vol. 96, 2011, pp. 1669-1675.

Li et al., "DMA Analysis on Bamboo Fiber/Polylactic Acid Composites", Mechanic Automation and Control Engineering (MACE), 2010 International Conference on Mechanic Automation and Control Engineering, 2010, pp. 3090-3092.

Hang, Leibniz Fangtinq, "Development of a polylactic acid (PLA) polymer with an acid-sensitive Nethoxybenzylimidazole (NEBI) crosslinker as a drug delivery system", UC San Diego Electronic Theses and Dissertations, 2012, 127 pages.

Coulembier et al., "From Jellyfish Macromolecular Architectures to Nanodoughnut Self-Assembly", Macromolecules, vol. 43, No. 1, 2010, pp. 575-579.

U.S. Patent Application Serial No. --/---,---, to Boday et al., entitled "Versatile, Facile and Scalable Route to Polylactic Acid-Backbone Graft and Bottlebrush Copolymers", filed concurrently, assigned to International Business Machines Corporation.

* cited by examiner

LACTIDE-FUNCTIONALIZED POLYMER

BACKGROUND

The present invention relates in general to the field of biobased materials. More particularly, the present invention relates to lactide-functionalized polymers prepared from brominated lactide monomer using atom transfer radical polymerization (ATRP).

SUMMARY

In accordance with some embodiments of the present invention, a lactide-functionalized polymer is represented by the following formula:

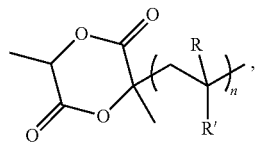

wherein R is a hydrogen atom or a methyl group, and wherein R' is a phenyl group or C(O)OR", wherein R" is an alkyl group having one or more carbon atoms.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

Figure 1:
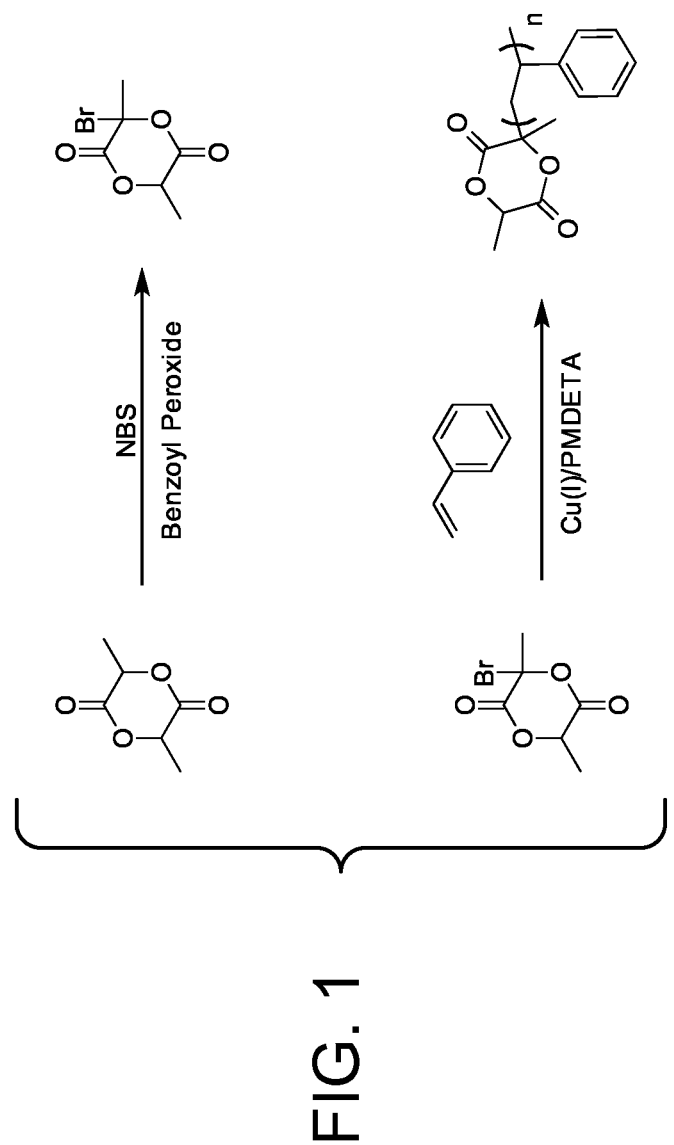
FIG. 1 is a chemical reaction diagram showing the preparation of the lactide-functionalized polymer 3-poly(styrene)-3,6-dimethyl-1,4-dioxane-2,5-dione from the atom transfer radical polymerization (ATRP) of styrene using the brominated lactide monomer 3-bromo-3,6-dimethyl-1,4-dioxane-2,5-dione as an initiator in accordance with some embodiments of the present invention.
Figure 2:
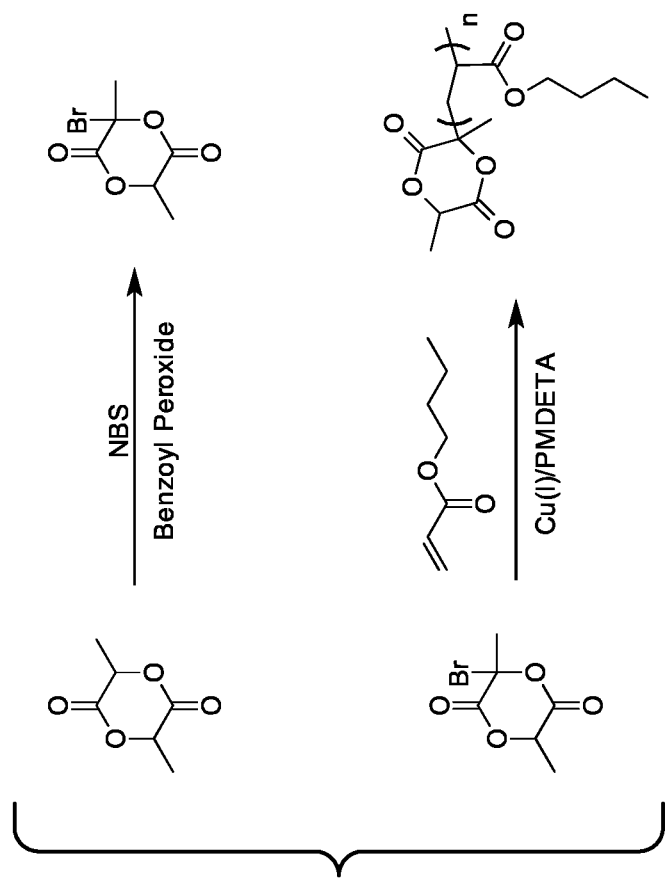
FIG. 2 is a chemical reaction diagram showing the preparation of the lactide-functionalized polymer 3-poly(butyl acrylate)-3,6-dimethyl-1,4-dioxane-2,5-dione from the atom transfer radical polymerization (ATRP) of butyl acrylate using the brominated lactide monomer 3-bromo-3,6-dimethyl-1,4-dioxane-2,5-dione as an initiator in accordance with some embodiments of the present invention.

The depletion of fossil fuels from which the majority of polymers are derived, combined with supply chain instability and cost fluctuations of feed chemicals used to make these polymers, is driving the development and utilization of biobased plastics for commodity applications. Polylactic acid (PLA), derived from starch and sugars, is a particularly appealing biobased plastic that is inexpensive and already being produced in large commercial quantities. In comparing polymers' material properties, polystyrene is often considered the petrochemical-based counterpart to PLA. Thus PLA is capable of replacing many petroleum-derived polymers in some applications. However, several of PLA's material properties—such as low heat-distortion temperature, high water adsorption, low flame retardancy, and low toughness—exclude the use of PLA in many applications. Moreover, additives to improve such properties are often expensive and/or come at the cost of sacrificing PLA's beneficial material properties. Hence much effort has been dedicated to directly incorporate chemical functionalities into the backbone of PLA (or PLA's monomer lactide) in order to tailor its properties, but because of the chemical lability of both lactide and PLA, examples of such chemical modification in the prior art typically are complex and low-yielding. A versatile and high-yielding approach to modify either PLA or lactide would greatly expand the profitability of PLA by virtue of its extension to many new end uses.

For purposes of this document, including the claims, the term "lactide" includes all stereoisomers of lactide (e.g., (S,S)-lactide, (R,R)-lactide, and (S,R)-lactide). (S,S)-lactide is also referred to as "L-lactide". (R,R)-lactide is also referred to as "D-lactide". (S,R)-lactide is also referred to as "meso-lactide". A racemic mixture of D-lactide and L-lactide is often referred to as "DL-lactide".

In accordance with some embodiments of the present invention, a simple, two-step method is employed to chemically modify lactide (PLA's monomer) in such a way that it can be functionalized with a wide array of different polymers designed to engineer specific properties to PLA. Brominated lactide (which may be formed in a one-step process from lactide monomer) can be used directly to initiate polymerization of a variety of monomers through a well-known, often-utilized process called atom-transfer radical polymerization (ATRP). This results in a lactide-functionalized polymer, i.e., a lactide molecule that is functionalized with a polymer. By using lactide as an ATRP-based initiator, it is possible to form well-defined, "living", and low polydispersity index (PDI) polymers. Hence, in accordance with some embodiments of the present invention, only two well-defined, high-yielding chemical reactions are required to synthesize a lactide-functionalized polymer.

ATRP is a polymerization technique that is well known to those skilled in the art. ATRP is a controlled "living" free radical polymerization technique. A low concentration of active radicals is maintained to promote slow growth of the molecular weight and, hence, the "living" ATRP process is controlled. Lactide-functionalized polymers synthesized in accordance with some embodiments of the present invention are "living" polymers in the same sense. These polymers present no inherent termination mechanism.

The polydispersity index (PDI) is a measure of the distribution of molecular mass in a given polymer sample. PDI is defined as $M_w/M_n$, where $M_w$ is the weight-average molecular weight and $M_n$ is the number-average molecular weight. Lactide-functionalized polymers synthesized in accordance with some embodiments of the present invention have low PDI (e.g., PDI≤1.1).

Lactide-functionalized polymers synthesized in accordance with the present invention may be used in numerous applications. In an exemplary application, lactide-functionalized polymers synthesized in accordance with some embodiments of the present invention may be used as macromonomers. Generally, macromonomers are oligomers with a number-average molecular weight $M_n$ between about 1000 and about 10,000 that contain at least one functional group suitable for further polymerization. In another exemplary application, the lactide endgroup of lactide-functionalized polymers synthesized in accordance with some embodiments of the present invention may be modified through hydrolysis or esterification to liberate more useful functional endgroups (e.g., hydroxyl, carboxylic acid, alkenyl, alkynl, and other endgroups) from which subsequent chemistry can be performed. In yet another exemplary application, lactide-functionalized polymers synthesized in accordance with some embodiments of the present invention may be used to functionalize surfaces, particles, or other functional polymers via a facile reaction of the lactide endgroup to hydroxyl or amine groups on the surface, particle, or other functional polymer.

A lactide-functionalized polymer is synthesized, in accordance with some embodiments of the present invention, by ATRP of a monomer capable of undergoing radical polymerization (e.g., styrenic, vinylic, acrylic, etc.) using 3-bromo-3,6-dimethyl-1,4-dioxane-2,5-dione as a brominated lactide initiator. 3-bromo-3,6-dimethyl-1,4-dioxane-2,5-dione may be prepared, for example, by reacting lactide with N-bromosuccinimide (NBS) in the presence of benzoyl peroxide. One skilled in the art will appreciate, however, that 3-bromo-3,6-dimethyl-1,4-dioxane-2,5-dione may be prepared using any number of methods known to those skilled in the art. For example, 3-bromo-3,6-dimethyl-1,4-dioxane-2,5-dione may be prepared by reacting lactide with bromine ($Br_2$) in the presence of benzoyl peroxide.

Lactide is a commercially available biobased cyclic ester monomer that can be obtained from biomass. Lactide is the cyclic di-ester of lactic acid. Lactide may be prepared by heating lactic acid in the presence of an acid catalyst. Lactide is a solid at room temperature. The melting point temperature of each of L-lactide and D-lactide is between 95 and 97° C. Racemic lactide has a melting point temperature between 116 and 119° C. The melting point temperature of meso-lactide is less than 60° C. (~53° C.).

The brominated lactide initiator, in the presence of a copper (I) and, optionally, copper (II) complex, an appropriate ligand (e.g., N,N,N',N',N-pentamethyldiethylenetriamine (PMDETA)) and a monomer capable of undergoing radical polymerization (e.g., styrenic, vinylic, acrylic, etc.) undergoes an ATRP reaction to form a lactide-functionalized polymer with a polymer backbone (the identity of polymer may be chosen to tailor material properties) and a lactide endgroup capable of, for example, being polymerized through traditional PLA synthetic methods or using as a standalone initiator. As an illustrative example, polymerization of styrene via ATRP may be performed in tetrahydrofuran (THF) at 60-70° C. In this example, the concentration of styrene may be approximately 1.6 M and the ratio of styrene to 3-bromo-3,6-dimethyl-1,4-dioxane-2,5-dione may be approximately 200. Alternatively, the ATRP reaction may be performed in a melt state (e.g., no solvent) using melt polymerization. Melt polymerization techniques are well known in the art.

As noted above, ATRP is a polymerization technique that is well known to those skilled in the art. ATRP can be used with myriad different monomers to produce myriad different polymers without undue experimentation. Generally, polymerization via ATRP is conducted under extremely low steady state concentration of active radicals, allowing propagation of the polymer chain to proceed with suppressed radical-radical coupling. For example, in some embodiments of the present invention, the monomer and initiator are added to a solution containing a catalytic copper/ligand complex (i.e., an ATRP catalyst and a ligand). Exemplary ATRP catalysts include, but are not limited to, copper(I) complexes such as copper(I) bromide (CuBr) and, optionally, copper(II) complexes such as copper(II) dibromide (CuBr2). Traditional ATRP can be done with added copper(II), but still must have some copper(I) added. Exemplary ligands include, but are not limited to, bipyridines such as 4,4'-dinonyl-2,2'bipyridine (DNBP) and bi-, tri- and tetradentate amines such as N,N,N',N',N-pentamethyldiethylenetriamine (PMDETA).

In some embodiments of the present invention, the catalytic copper/ligand complex is deoxygenated using known techniques such as successive cycles of freeze-pump-thaw. One skilled in the art will appreciate, however, that other techniques for deoxygenating the mixture may be used in lieu of, or in addition to, successive cycles of freeze-pump-thaw.

The ratio of ATRP catalyst (e.g., CuBr) to monomer (e.g., styrene) can vary, although suitable results are obtained with ratios of 10:1-50:1. The ratio of monomer (e.g., styrene) to initiator (e.g., 3-bromo-3,6-dimethyl-1,4-dioxane-2,5-dione) may also vary, although ratios of about 1:10-1:200 (or more) provide suitable results.

The polymerization is performed at an appropriate temperature, for example, 60-70° C. The appropriate temperature can vary, however, depending on a number of factors including, but not limited to, the identity of the monomer, the initiator, the ATRP catalyst, and the ligand, as well as the boiling point of the solvent, if any.

The order of addition of the reagents can have a profound affect on the initiator efficiency. To optimize this, the copper/ligand complex must be formed with a slight excess of copper prior to exposure to the brominated lactide initiator. Reaction Scheme 1, described below, is a general synthetic example of the polymerization in accordance with some embodiments of the present invention. In the first step of Reaction Scheme 1, brominated lactide monomer 3-bromo-3,6-dimethyl-1,4-dioxane-2,5-dione is prepared by reacting lactide with N-bromosuccinimide (NBS) in the presence of benzoyl peroxide. In the second step of Reaction Scheme 1, a lactide-functionalized polymer is obtained by ATRP of a monomer capable of undergoing radical polymerization (e.g., styrenic, vinylic, acrylic, etc.) initiated from the brominated lactide monomer in the presence of a copper (I) complex/PMDETA.

(Reaction Scheme 1)

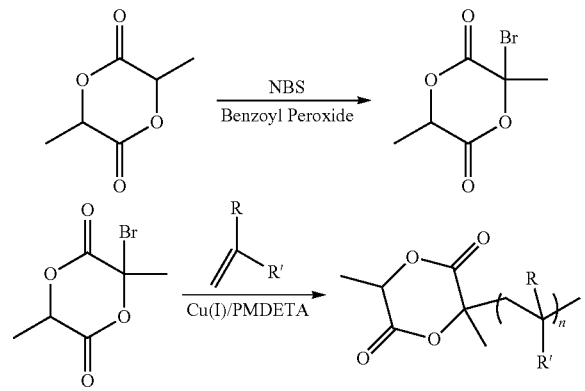

In the second step of Reaction Scheme 1, R is a hydrogen atom or a methyl group, and R' is a phenyl group or C(O)OR", wherein R" is an alkyl group having one or more carbon atoms. Suitable examples of monomers capable of undergoing radical polymerization include, but are not limited to, styrene, butyl acrylate, methyl acrylate, 2-ethylhexyl acrylate, ethyl acrylate, 2-ethylhexl methacrylate, ethyl methacrylate, butyl methacrylate, and combinations thereof.

Lactide-functionalized polymers in accordance with some embodiments of the present invention are synthesized using L-lactide as the starting material. In the first step of Reaction Scheme 1, a bromine addition on the L-lactide is employed to synthesize brominated lactide monomer 3-bromo-3,6-dimethyl-1,4-dioxane-2,5-dione. In the second step of Reaction Scheme 1, a monomer capable of undergoing radical polymerization is polymerized via ATRP using the brominated lactide monomer as an initiator.

In the first step of Reaction Scheme 1, a mixture of L-lactide, benzene and N-bromosuccimide (NBS) are added to a three-neck flask and heated to reflux. Generally, stoichiometric amounts of L-lactide and NBS are used. Mechanical stirring is employed throughout reflux. A solution of benzoyl peroxide in benzene is then added dropwise over time through a dropping funnel, syringe or other suitable technique. Generally, any catalytic amount of benzoyl peroxide may be used. One skilled in the art will appreciate that any suitable solvent may be used in these solutions in lieu, or in addition to, benzene. Suitable solvents include, but are not limited to, benzene and acetonitrile. After the monomer is consumed, the reaction mixture is cooled to room temperature. The reaction product, which is brominated lactide monomer 3-bromo-3,6-dimethyl-1,4-dioxane-2,5-dione, may be purified using techniques well known in the art.

In the second step of Reaction Scheme 1, CuBr and N,N,N',N',N-pentamethyldiethylenetriamine (PMDETA) are added to a first flask, along with a magnetic stirrer. The first flask is fitted with a rubber septum and degassed with three successive cycles of freeze-pump-thaw. Generally, the catalytic complex must be formed with a slight excess of copper ($[Cu]_0/[PMDETA]_0>1$) before exposure to the lactide initiator. Providing a slight excess of copper prevents undesirable side reactions. To a second flask are added some of the 3-bromo-3,6-dimethyl-1,4-dioxane-2,5-dione prepared in the first step of Reaction Scheme 1, THF, and a monomer capable of undergoing radical polymerization. Generally, the ratio of $[monomer]_0/[3\text{-bromo-3,6-dimethyl-1,4-dioxane-2,5-dione}]_0$ that may be used ranges from 1:10-1:200 (or more). The second flask is fitted with a rubber septum and degassed by bubbling with $N_2$ flow for at least 30 minutes. This mixture is then transferred into the first flask and the polymerization is carried out under stiffing at a suitable temperature. Polymerization typically occurs over a period of hours. Generally, the polymerization of the monomer via ATRP may be performed in THF at 60-70° C. The reaction product, which is lactide-functionalized polymer 3-poly(monomer)-3,6-dimethyl-1,4-dioxane-2,5-dione, may be purified using techniques well known in the art.

One skilled in the art will appreciate that any suitable catalytic complex may be used in lieu, or in addition to, CuBr/PMDETA catalytic complex. Suitable catalytic complexes include both a suitable ATRP catalyst and a suitable ligand. Suitable ATRP catalysts include, but are not limited to, copper(I) complexes such as CuBr or other copper halides. Suitable ligands include, but are not limited to, bipyridines and bi-, tri- and tetradentate amines. Specific examples of suitable ligands include 4,4'-dinonyl-2,2'bipyridine (DNBP), N,N,N',N',N-pentamethyldiethylenetriamine (PMDETA), and 1,1,4,7,10,10-hexamethyltriethylenetetramine (HMTETA).

PROPHETIC EXAMPLE 1

Synthesis of 3-poly(styrene)-3,6-dimethyl-1,4-dioxane-2,5-dione by Polymerizing Styrene Via ATRP Using 3-bromo-3,6-dimethyl-1,4-dioxane-2,5-dione as an Initiator In this prophetic example, lactide-functionalized polymer 3-poly(styrene)-3,6-dimethyl-1,4-dioxane-2,5-dione is synthesized using L-lactide as the starting material. For this synthesis, as illustrated in FIG. 1, a bromine addition on the L-lactide is employed to synthesize brominated lactide monomer 3-bromo-3,6-dimethyl-1,4-dioxane-2,5-dione, followed by polymerization of styrene via ATRP using the brominated lactide monomer as an initiator.

Synthesis of
3-bromo-3,6-dimethyl-1,4-dioxane-2,5-dione

To a 1 L three-neck flask are added L-lactide (100.0 g, 0.694 mol), benzene (500 mL) and N-bromosuccimide (NBS) (136.0 g, 0.764 mmol). The mixture is heated to reflux (approximately 80° C.). Mechanical stirring is employed throughout reflux.

A solution of benzoyl peroxide (3.36 g, 13.9 mmol) in benzene (50 mL) is then added dropwise through a dropping funnel over 20 minutes.

After the monomer is consumed, the reaction mixture is cooled to room temperature. Then, filtration is employed to separate the solid filtride from the liquid filtrate.

The solid filtride from the filtration is evaporated to dryness forming a pale yellow solid. The solid is dissolved in dichloromethane (750 mL) and the solution is washed with saturated sodium bisulfate solution three times and saturated NaCl solution once. The organic layer is dried over $MgSO_4$, and the solution is evaporated to dryness. The orange solid is recrystallized from ethyl acetate and hexanes to produce 68.9 g of white crystals. One skilled in the art will appreciate that recrystallization may be performed in other suitable solutions.

The liquid filtrate from the filtration is evaporated to dryness, and the solid is recrystallized from ethyl acetate and hexanes to produce 27.1 g of white crystals. Here too, one skilled in the art will appreciate that recrystallization may be performed in other suitable solutions.

The combined yield (from both the solid filtride and the liquid filtrate) is 96.1 g (62%).

Synthesis of
3-poly(styrene)-3,6-dimethyl-1,4-dioxane-2,5-dione

To a first flask are added CuBr (70.5 mg, 0.49 mmol) and N,N,N',N',N-pentamethyldiethylenetriamine (PMDETA) (77.5 mg, 0.45 mmol), as well as a magnetic stirrer. The first flask is fitted with a rubber septum and degassed with three successive cycles of freeze-pump-thaw. Generally, the catalytic complex must be formed with a slight excess of copper ($[Cu]_0/[PMDETA]_0>1$) before exposure to the lactide initiator. Providing a slight excess of copper prevents undesirable side reactions.

To a second flask are added some of the 3-bromo-3,6-dimethyl-1,4-dioxane-2,5-dione (99.7 mg, 0.45 mmol) prepared in the first step of this example, THF (10 mL), and styrene (5 mL, 43.64 mmol). Generally, the ratio of $[styrene]_0/[3\text{-bromo-3,6-dimethyl-1,4-dioxane-2,5-dione}]_0$ that may be used ranges from 10 to 200. The second flask is fitted with a rubber septum and degassed by bubbling with $N_2$ flow for at least 30 minutes. This mixture is then transferred into the first flask and the polymerization is carried out under stirring at 70° C. Polymerization occurs over a period of 0.5-4 hours. Generally, the polymerization of styrene via ATRP may be performed in THF at 60-70° C. for a $[styrene]_0$ of 0.5-5 M and $[styrene]_0/[3\text{-bromo-3,6-dimethyl-1,4-dioxane-2,5-dione}]_0$ of 10-200.

Copper catalyst is removed by passing the reaction mixture diluted with THF through an alumina gel column.

The 3-poly(styrene)-3,6-dimethyl-1,4-dioxane-2,5-dione is recovered by precipitation in 7-fold excess of cold methanol, filtrated and dried up to constant weight.

PROPHETIC EXAMPLE 2

Synthesis of 3-poly(butyl acrylate)-3,6-dimethyl-1,4-dioxane-2,5-dione by Polymerizing Butyl Acrylate Via ATRP Using 3-bromo-3,6-dimethyl-1,4-dioxane-2,5-dione as an Initiator In this prophetic example, lactide-functionalized polymer 3-poly(butyl acrylate)-3,6-dimethyl-1,4-dioxane-2,5-dione is synthesized using L-lactide as the starting material. For this synthesis, as illustrated in FIG. 1, a bromine addition on the L-lactide is employed to synthesize brominated lactide monomer 3-bromo-3,6-dimethyl-1,4-dioxane-2,5-dione, followed by polymerization of butyl acrylate via ATRP using the brominated lactide monomer as an initiator.

Synthesis of 3-bromo-3,6-dimethyl-1,4-dioxane-2,5-dione

To a 1 L three-neck flask are added L-lactide (100.0 g, 0.694 mol), benzene (500 mL) and N-bromosuccimide (NBS) (136.0 g, 0.764 mmol). The mixture is heated to reflux (approximately 80° C.). Generally, stoichiometric amounts of L-lactide and NBS are used. Mechanical stiffing is employed throughout reflux.

A solution of benzoyl peroxide (3.36 g, 13.9 mmol) in benzene (50 mL) is then added dropwise through a dropping funnel over 20 minutes.

After the monomer is consumed, the reaction mixture is cooled to room temperature. Then, filtration is employed to separate the solid filtride from the liquid filtrate.

The solid filtride from the filtration is evaporated to dryness forming a pale yellow solid. The solid is dissolved in dichloromethane (750 mL) and the solution is washed with saturated sodium bisulfate solution three times and saturated NaCl solution once. The organic layer is dried over $MgSO_4$, and the solution is evaporated to dryness. The orange solid is recrystallized from ethyl acetate and hexanes to produce 68.9 g of white crystals. One skilled in the art will appreciate that recrystallization may be performed in other suitable solutions.

The liquid filtrate from the filtration is evaporated to dryness, and the solid is recrystallized from ethyl acetate and hexanes to produce 27.1 g of white crystals. Here too, one skilled in the art will appreciate that recrystallization may be performed in other suitable solutions.

The combined yield (from both the solid filtride and the liquid filtrate) is 96.1 g (62%).

Synthesis of 3-poly(butyl acrylate)-3,6-dimethyl-1,4-dioxane-2,5-dione

To a first flask are added CuBr (70.5 mg, 0.49 mmol) and N,N,N',N',N-pentamethyldiethylenetriamine (PMDETA) (77.5 mg, 0.45 mmol), as well as a magnetic stirrer. The first flask is fitted with a rubber septum and degassed with three successive cycles of freeze-pump-thaw. Generally, the catalytic complex must be formed with a slight excess of copper ($[Cu]_0/[PMDETA]_0 > 1$) before exposure to the lactide initiator. Providing a slight excess of copper prevents undesirable side reactions.

To a second flask are added some of the 3-bromo-3,6-dimethyl-1,4-dioxane-2,5-dione (99.7 mg, 0.45 mmol) prepared in the first step of this example, THF (10 mL), and butyl acrylate (5 mL, 34.85 mmol). Generally, the ratio of [butyl acrylate]$_0$/[3-bromo-3,6-dimethyl-1,4-dioxane-2,5-dione]$_0$ that may be used ranges from 10 to 200. The flask is fitted with a rubber septum and degassed by bubbling with $N_2$ flow for at least 30 minutes. This mixture is then transferred into the first flask and the polymerization is carried out under stirring at 70° C. Polymerization occurs over a period of 0.5-4 hours. Generally, the polymerization of butyl acrylate via ATRP may be performed in THF at 60-70° C. for a [butyl acrylate]$_0$ of 0.5-5 M and [butyl acrylate]$_0$/[3-bromo-3,6-dimethyl-1,4-dioxane-2,5-dione]$_0$ of 10-200.

Copper catalyst is removed by passing the reaction mixture diluted with THF through an alumina gel column.

The 3-poly(butyl acrylate)-3,6-dimethyl-1,4-dioxane-2,5-dione is recovered by precipitation in 7-fold excess of cold methanol, filtrated and dried up to constant weight.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A lactide-functionalized polymer represented by the following formula:

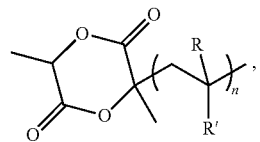

wherein R is a hydrogen atom or a methyl group, wherein R' is a phenyl group, wherein the variable n denotes a degree of polymerization of repeating units, and wherein the value of the variable n is greater than 1.

2. A lactide-functionalized polymer represented by the following formula:

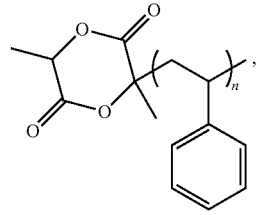

wherein the variable n denotes a degree of polymerization of repeating units, and wherein the value of the variable n is greater than 1.

3. The lactide-functionalized polymer as recited in claim 1, wherein the lactide-functionalized polymer is represented by the following formula:

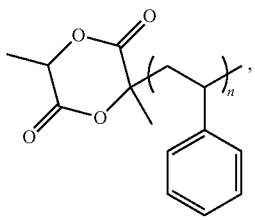

wherein the variable n denotes a degree of polymerization of repeating units, and wherein the value of the variable n is sufficient to provide the lactide-functionalized polymer with a number average molecular weight $M_n$ between about 1000 and about 10,000.

4. A lactide-functionalized polymer represented by the following formula:

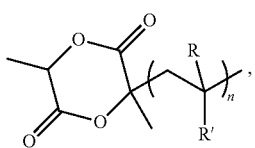

wherein R is a hydrogen atom or a methyl group, wherein R' is a phenyl group, wherein the variable n denotes a degree of polymerization of repeating units, and wherein the value of the variable n is sufficient to provide the lactide-functionalized polymer with a number average molecular weight $M_n$ between about 1000 and about 10,000.

* * * * *